(12) United States Patent
Claussen et al.

(10) Patent No.: US 8,606,244 B2
(45) Date of Patent: Dec. 10, 2013

(54) PROVIDING LOCATION INFORMATION

(75) Inventors: Holger Claussen, Strafan (IE); Malek Shahid, Chippenham (GB)

(73) Assignee: Alcatel Lucent, Paris (FR)

( * ) Notice: Subject to any disclaimer, the term of this patent is extended or adjusted under 35 U.S.C. 154(b) by 57 days.

(21) Appl. No.: 13/132,414

(22) PCT Filed: Dec. 3, 2009

(86) PCT No.: PCT/EP2009/008629
§ 371 (c)(1),
(2), (4) Date: Aug. 22, 2011

(87) PCT Pub. No.: WO2010/063469
PCT Pub. Date: Jun. 10, 2010

(65) Prior Publication Data
US 2011/0294506 A1    Dec. 1, 2011

(30) Foreign Application Priority Data
Dec. 4, 2008   (EP) .................................... 08360040

(51) Int. Cl.
    H04W 88/02       (2009.01)
(52) U.S. Cl.
    USPC ....................................................... 455/414.1
(58) Field of Classification Search
    USPC ........ 455/414.1, 456.1, 422.1, 437, 458, 440,
              455/507, 403, 436, 411, 433, 466; 370/331,
                         370/338, 241; 709/217, 224, 232, 203
    See application file for complete search history.

(56) References Cited

U.S. PATENT DOCUMENTS

| | | | |
|---|---|---|---|
| 2010/0173630 A1* | 7/2010 | Han et al. | 455/433 |
| 2011/0269427 A1* | 11/2011 | Kurokawa et al. | 455/411 |
| 2012/0021736 A1* | 1/2012 | Miyagawa et al. | 455/422.1 |
| 2012/0238247 A1* | 9/2012 | Wen et al. | 455/411 |
| 2012/0258743 A1* | 10/2012 | Kurokawa et al. | 455/466 |
| 2012/0322452 A1* | 12/2012 | Samuel et al. | 455/437 |

FOREIGN PATENT DOCUMENTS

| | | |
|---|---|---|
| WO | WO 02/085049 A1 | 10/2002 |
| WO | WO 2008/093103 A2 | 8/2008 |
| WO | WO 2008/132946 A1 | 11/2008 |

OTHER PUBLICATIONS

International Search Report for PCT/EP2009/008629 dated Feb. 19, 2010.

* cited by examiner

*Primary Examiner* — Diane Mizrahi
(74) *Attorney, Agent, or Firm* — Fay Sharpe LLP (57) ABSTRACT

A method of providing location information to a network application, a location server, a method of providing a trigger notification, a femto base station and a computer program product are disclosed. The method comprises the steps of: receiving details of a triggering event which is to be notified to the network application, the triggering event being a registration of user equipment with a predetermined femto cell of the wireless telecommunications network; providing triggering information indicative of the triggering event to that femto base station providing wireless communications coverage to the predetermined femto cell to cause that femto base station to provide a trigger notification indicating when the triggering event occurs; and in response to receipt of the trigger notification from the femto base station, providing location information to the network application, the location information providing the network application with an indication of the user equipment and the predetermined femto cell, together with an indication of when the triggering event occurred. This enables the movement of user equipment into specific locations to be detected and provided to network application efficiently, without any subsequent location determination processing having to occur, which provides a low-power, scalable, accurate and non-invasive approach requiring no modification of user equipment.

7 Claims, 5 Drawing Sheets

PROVIDING LOCATION INFORMATION

FIELD OF THE INVENTION

The present invention relates to a method of providing location information to a network application, a location server, a method of providing a trigger notification; a femto base station and a computer program product.

BACKGROUND OF THE INVENTION

Techniques for providing information relating to the location of user equipment within a wireless telecommunications network are known. In one approach, provided the user equipment has connectivity with at least three base stations, it is possible to determine an approximate location of the user equipment using triangularisation. In an alternative approach, global positioning system (GPS) technology is provided within the user equipment and this is utilised to obtain the location of the user equipment. Once the location of the user equipment is known, this information can be utilised by network applications to provide location-specific services.

WO 02/085049 discloses a method for deferred location reporting in a cellular network. When it is desired for the location of user to be monitored, a user is identified and a deferred location report for that user is requested with the trigger location change event being a change of routing area. The request message is forwarded via the GMLC and the MSC to the RNC currently supporting the user. The RNC monitors the user to see whether it changes area or not. When the RNC detects a change of area it sends a location report message. The location report message identifies the new area in which the user is currently located, which may be provided either by geographical coordinates or some information related to the structure of the network. This information is then provided back via the MSC and GMLC to the requesting client. This requires the user equipment to provide an active signalling connection by maintaining the user equipment in or triggering the user equipment into the ready mode. In an alternative arrangement, predefined areas can be monitored instead of predefined users and every user which enters or leaves a particular service area is reported.

It is desired to provide an improved technique for determining the location of user equipment.

SUMMARY OF THE INVENTION

According to a first aspect of the present invention, there is provided a method of providing location information to a network application, the location information indicating a location of user equipment within a wireless telecommunications network, the method comprising the steps of: receiving details of a triggering event which is to be notified to the network application, the triggering event being a registration of a predetermined user equipment with a predetermined femto cell of the wireless telecommunications network; providing triggering information indicative of the triggering event to that femto base station providing wireless communications coverage to the predetermined femto cell to cause that femto base station to provide a trigger notification indicating when the triggering event occurs; and in response to receipt of the trigger notification from the femto base station, providing location information to the network application, the location information providing the network application with an indication of the predetermined user equipment and the predetermined femto cell, together with an indication of when the triggering event occurred.

The first aspect recognises that a problem with the triangularisation technique is that the user equipment needs to be in an active mode for the technique to work, which consumes power. Also, the accuracy is, at best, to within 50 meters if many base station connections are available, but this becomes very much less accurate as the number of base station connections reduces. A problem with the GPS approach is that dedicated GPS hardware needs to be provided in the user equipment, such hardware is often not provided within user equipment since it significantly increases costs. Also, the GPS technique does not work well in buildings where location information might have most useful application. Furthermore, both techniques provide information on the current location of the user equipment, but do not generate a notification when the user moves to a location of interest and so a further assessment needs to be made in order to determine whether the location determined by these techniques indicate that the user equipment is indeed in a location of interest. Therefore, using those techniques, the location of the mobile must be monitored continuously and compared with any locations of interests. This results in a high overhead requiring additional signalling and processing, which provides for poor scalability.

Accordingly, details of a triggering event which is to be notified to a network application is received. This triggering event is a registration of user equipment within a particular femto cell of a wireless telecommunications network. Such registration of user equipment may comprise registration information exchange between the user equipment and the femtocell required for a handover to the femtocell in active mode, or for camping of the user equipment on the femtocell in idle mode. From this triggering event, triggering information is then provided to the femto base station which provides communications coverage to the particular femto cell at the location of interest and this triggering information causes the femto base station to provide a trigger notification which indicates when the registration of the particular user equipment occurs within the femto cell, thereby indicating the presence of the particular user equipment at a location of interest. When a trigger notification is received from the femto base station, location information is provided to the network application, which provides the network application with an indication of when a trigger event occurred, together with details of the particular user equipment and femto cell where the registration occurred. Through this approach, details of triggering events to be notified to an application may be defined. This information is then passed on to the femto base station of interest. When the user equipment registers with that femto base station, a notification is provided. That notification may then be used to provide an indication of when a trigger event occurred, together with which user equipment and femto base station the event related to. This enables the movement of user equipment into specific locations to be detected and provided to network application efficiently, without any subsequent location determination processing having to occur. A precise determination of the location of the user equipment can be made because the coverage provided by a femto cell is typically in the range of tens of meters or less. Accordingly, this approach is significantly more accurate than the triangularisation technique, even when there is connectivity with just one femto base station. Furthermore, registration with a femto base station can occur even when the user equipment is idle and so mobility events can be detected without the user equipment needing to operate in the active mode, thereby saving power. Furthermore, the registration of user equipment with base stations is a standard user equipment feature requiring no additional functionality to be provided and so this technique will work with standard user equipment, unlike the GPS approach which requires additional functionality. Also, unlike the GPS approach, a femto cell will typically provide coverage within buildings. Hence, a low-power, scalable, accurate and non-invasive approach, which requires no modification of user equipment, is provided which enables the location of the user equipment to be readily determined and that information provided to network applications for use with user-subscribed services.

In one embodiment, the triggering event comprises registration of the predetermined user equipment with the predetermined femto cell for a predetermined period of time and the triggering information indicates to the femto base station that registration of the predetermined user equipment for the predetermined period of time should occur before the trigger notification is provided. Accordingly, the triggering event of interest to the network application may be the registration of particular user equipment within a particular femto cell for a particular period of time. The triggering information indicates this registration period and the user equipment of interest and provides this to the femto base station to ensure that only when that event occurs is triggering event generated. It will appreciated that through this approach transiting user equipment do not cause a triggering event to occur unnecessarily and the network application is only informed of the triggering event when the user equipment has been within the femto cell for a particular period of time.

In one embodiment, the method comprises the step of: receiving details of a location update rate following a triggering event; providing update information to the femto base station in response to the update rate, the update information being indicative of a rate at which the femto base station should determine whether the predetermined user equipment can still support wireless communications with the predetermined femto cell. Accordingly, the network application may specify how regularly an update of the location of the user equipment is to be made. This is provided to the femto base station, which then makes a determination of whether the user equipment is still in communication at that update rate. It will be appreciated that some services provided by some network applications require an accurate assessment of the time spent by the user equipment within the femto cell and therefore warrant a high update rate, whereas other services provided by other network applications may require a less accurate assessment and therefore may warrant a lower update rate.

In one embodiment, the update information comprises an indication of a rate at which the femto base station is to repeatedly send a paging message to the predetermined user equipment. Accordingly, to detect if a user equipment is still located in a femto cell in an idle mode, the femto base station may be instructed to repeatedly transmit a paging message to the user equipment at the update rate. If the user equipment is no longer in the femto cell, then no response to the paging message will be received.

In one embodiment, the method comprises the step of: upon receipt of an indication from the femto base station that the predetermined user equipment can no longer support wireless communications with the predetermined femto cell, the indication comprising information indicating when the predetermined user equipment was last determined to have wireless communications with the predetermined femto cell, providing location information to the network application identifying when the predetermined user equipment was last determined to support wireless communications with the predetermined femto cell. Accordingly, should it be determined that the user equipment is no longer within the femto cell, then an indication is received from the femto base station that the user equipment is no longer present, together with an indication of the last time that it was established that the user equipment was present within the femto cell. This information may then be provided to the network application and the duration that the user equipment was present within the femto cell may be established.

In one embodiment, the step of receiving comprises: receiving details of a plurality of triggering events, each of which is to be notified to the network application, each triggering event being a registration of a predetermined one of a plurality of the user equipment with a predetermined one of a plurality of the predetermined femto cells of the wireless telecommunications network, the step of providing comprises: providing triggering information indicative of each of the plurality of triggering events to those femto base stations providing wireless communications coverage to the plurality of the predetermined femto cells to cause those femto base stations to provide a trigger notification indicating when one of the triggering events occurs; and in response to receipt of the trigger notification from one of the femto base stations, providing location information to the network application, the location information providing the network application with a unique identifier indicative of the predetermined user equipment and a unique identifier indicative of the predetermined femto cell, together with an indication of when the triggering event occurred. Accordingly, when an application requires location information relating to multiple user equipment entering multiple femto cells, it provides details of those triggering events. Information relating to those triggering events are then provided to each of the femto cells of interest, which are requested to report the occurrence of those events, together with when they happen. The occurrence of those events is then passed back to the network application as they occur.

In one embodiment, the triggering event is due to a movement of the predetermined user equipment into the predetermined femto cell which causes registration between the predetermined user equipment and the femto base station.

In one embodiment, the indication of an occurrence of the triggering event comprises a time at which the predetermined user equipment established wireless communications with the femto base station.

According to a second aspect of the present invention, there is provided a computer program product operable, when executed on a computer, to perform the method steps of the first aspect.

According to a third aspect of the present invention, there is provided a location server operable to provide location information to a network application, the location information indicating a location of user equipment within a wireless telecommunications network, the location server comprising: triggering event reception logic operable to receive details of a triggering event which is to be notified to the network application, the triggering event being a registration of a predetermined user equipment with a predetermined femto cell of the wireless telecommunications network; trigger information transmission logic operable to provide triggering information indicative of the triggering event to that femto base station providing wireless communications coverage to the predetermined femto cell to cause that femto base station to provide a trigger notification indicating when the triggering event occurs; and trigger notification reception logic operable, in response to receipt of the trigger notification from the femto base station, to provide location information to the network application, the location information providing the network application with an indication of the predetermined user equipment and the predetermined femto cell, together with an indication of when the triggering event occurred.

In one embodiment, the triggering event comprises registration of the predetermined user equipment with the predetermined femto cell for a predetermined period of time and the triggering information indicates to the femto base station that registration of the predetermined user equipment for the predetermined period of time should occur before the trigger notification is provided.

In one embodiment, the triggering event reception logic is operable to receive details of a location update rate following a triggering event; and the trigger information transmission logic is operable to provide update information to the femto base station in response to the update rate, the update information being indicative of a rate at which the femto base station should determine whether the predetermined user equipment can still support wireless communications with the predetermined femto cell.

In one embodiment, the update information comprises an indication of a rate at which the femto base station is to repeatedly send a paging message to the predetermined user equipment.

In one embodiment, the trigger notification reception logic is operable, upon receipt of an indication from the femto base station that the predetermined user equipment can no longer support wireless communications with the predetermined femto cell, the indication comprising information indicating when the user equipment was last determined to have wireless communications with the predetermined femto cell, to provide location information to the network application identifying when the predetermined user equipment was last determined to support wireless communications with the predetermined femto cell.

In one embodiment, the triggering event reception logic is operable to receive details of a plurality of triggering events, each of which is to be notified to the network application, each triggering event being a registration of a predetermined one of a plurality of the predetermined user equipment with a predetermined one of a plurality of the predetermined femto cells of the wireless telecommunications network, the trigger information transmission logic is operable to provide triggering information indicative of each of the plurality of triggering events to those femto base stations providing wireless communications coverage to the plurality of the predetermined femto cells to cause those femto base stations to provide a trigger notification indicating when one of the triggering events occurs; and the trigger notification reception logic is operable, in response to receipt of the trigger notification from one of the femto base stations, to provide location information to the network application, the location information providing the network application with a unique identifier indicative of the predetermined user equipment and a unique identifier indicative of the predetermined femto cell, together with an indication of when the triggering event occurred.

According to a fourth aspect of the present invention, there is provided a method of providing a trigger notification indicating when a triggering event occurs, the trigger event being a registration of a predetermined user equipment with a predetermined femto cell of a wireless telecommunications network, the method comprising the steps of: receiving triggering information indicative of the triggering event which is notifiable when the triggering event occurs at a femto base station providing wireless communications coverage to the predetermined femto cell; detecting registration of predetermined user equipment with the predetermined femto cell at the femto base station; and upon detecting registration of the predetermined user equipment with the predetermined femto cell, providing a trigger notification indicating when the triggering event occurred.

In one embodiment, adjacent cells within the wireless network are allocated differing location area codes and the step of detecting registration comprises: receiving a registration request from the predetermined user equipment due to a differing location area code being associated with the predetermined femto cell. By allocating adjacent cells within the wireless network different location area codes, user equipment are forced to perform update procedures and this update procedure provides an indication of a triggering event.

In one embodiment, the triggering information indicates to the femto base station registration of the predetermined user equipment with the predetermined femto cell should occur for a predetermined period of time prior to providing a trigger notification and the step of providing comprises: providing a trigger notification indicating when registration of the predetermined user equipment with the predetermined femto cell at the femto base station has been detected for at least the predetermined period of time.

In one embodiment, the method comprises the step of: receiving update information at the femto base station indicative of a rate at which the femto base station is to determine whether the predetermined user equipment can still support wireless communications with the predetermined femto cell; and repeatedly sending a paging message to the predetermined user equipment at the rate.

In one embodiment, the method comprises the step of: in the absence of a response to the paging message, providing a notification indicating when the predetermined user equipment was last determined to support wireless communications with the predetermined femto cell.

According to a fifth aspect of the present invention, there is provided a computer program product, operable when executed on a computer, to perform the method step of the fourth aspect.

According to a sixth aspect of the present invention, there is provided a femto base station operable to provide a trigger notification indicating when a triggering event occurs, the trigger event being a registration of a predetermined user equipment with a femto cell of a wireless telecommunications network supported by the femto base station, the femto base station comprising: trigger information reception logic operable to receive triggering information indicative of a triggering event which is notifiable when the triggering event occurs; detection logic operable to detect registration of predetermined user equipment; and trigger notification logic operable, upon detecting registration of predetermined user equipment with the femto cell, to provide a trigger notification indicating when the triggering event occurred.

In one embodiment, adjacent cells within the wireless network are allocated differing location area codes and the detection logic is operable to receive a registration request from the predetermined user equipment due to a differing location area code being associated with the predetermined femto cell.

In one embodiment, the triggering information indicates to the femto base station that registration of the predetermined user equipment with the predetermined femto cell should occur for a predetermined period of time prior to providing a trigger notification and the trigger notification logic is operable to provide a trigger notification indicating when registration of the predetermined user equipment with the predetermined femto cell at the femto base station has been detected for at least the predetermined period of time.

In one embodiment, the trigger information reception logic is operable to receive update information indicative of a rate at which the femto base station is to determine whether the predetermined user equipment can still support wireless communications with the predetermined femto cell; the detection logic is operable to repeatedly send a paging message to the predetermined user equipment at the rate.

In one embodiment, the trigger notification logic is operable, in the absence of a response to the paging message, to provide a notification indicating when the predetermined user equipment was last determined to support wireless communications with the predetermined femto cell.

In one embodiment, the indication of the user equipment comprises a unique international mobile subscriber identifier.

In one embodiment, the location area codes used by the femto cell are not used by macro cells.

Further particular and preferred aspects of the present invention are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DESCRIPTION OF THE EMBODIMENTS

Figure 1:
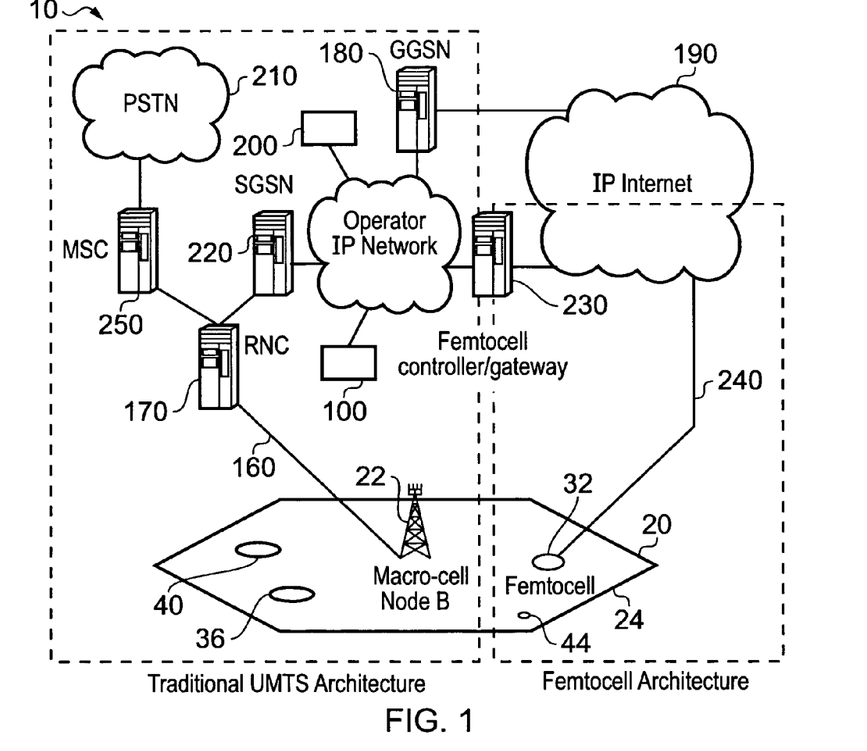
FIG. 1 illustrates the main components of a telecommunications network according to one embodiment.

FIG. 1 illustrates a wireless communication system, generally 10, according to one embodiment. User equipment 44 roam through the wireless communication system 10. Base stations 22 are provided which support respective macro cells 24. A number of such base stations are provided, which are distributed geographically in order to provide a wide area of coverage to the user equipment 44. When user equipment 44 is within a macro cell 24 supported by the base station 22 then communications may be established between the user equipment 44 and the base station 22 over an associated radio link. Each base station typically supports a number of sectors. Typically, a different antenna within a base station supports an associated sector. Accordingly, each base station has multiple antennas and signals sent through the different antennas are electronically weighted to provide a sectorised approach. Of course, it will be appreciated that FIG. 1 illustrates a small subset of the total number of user equipment and base stations that may be present in a typical communications system.

The wireless communication system 10 is managed by a radio network controller 170. The radio network controller 170 controls the operation of the wireless communications system 10 by communicating with the base stations 22 over a backhaul communications link 160. The network controller 170 also communicates with the user equipment 44 via their respective radio links in order to efficiently manage the wireless communication system 10.

The radio network controller 170 maintains a neighbour list which includes information about the geographical relationship between cells supported by base stations. In addition, the radio network controller 170 maintains location information which provides information on the location of the user equipment within the wireless communications system 10. The radio network controller 170 is operable to route traffic via circuit-switched and packet-switched networks. Hence, a mobile switching centre 250 is provided with which the radio network controller 170 may communicate. The mobile switching centre 250 then communicates with a circuit-switched network such as a public switched telephone network (PSTN) 210. Likewise, the network controller 170 communicates with service general packet radio service support nodes (SGSNs) 220 and a gateway general packet radio support node (GGSN) 180. The GGSN then communicates with a packet-switch core 190 such as, for example, the Internet.

Figure 2:
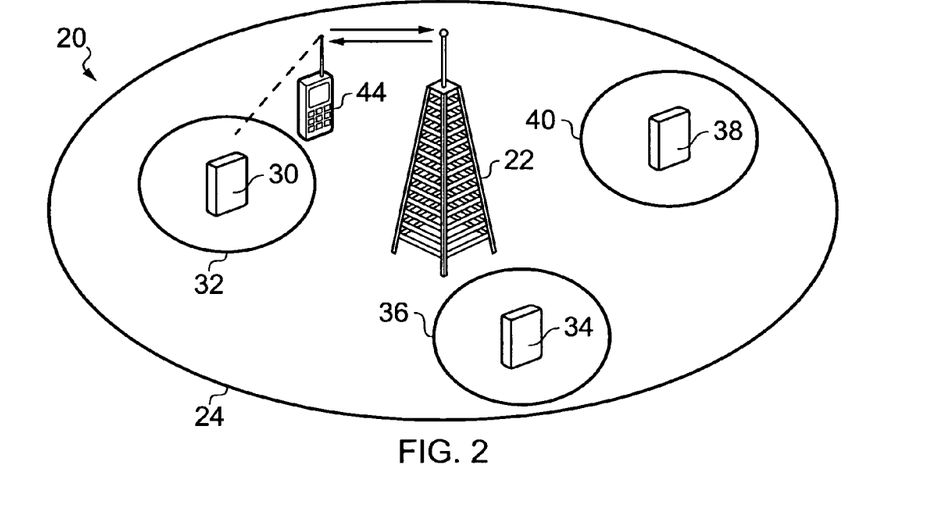
FIG. 2 illustrates an example femto cell deployment within one macro cell shown in FIG. 1.

As shown in more detail in FIG. 2, there are provided femto cell base stations 30, 34, 38 each of which provides a femto cell 32, 36, 40 in the vicinity of a building within which the associated femto cell base station is installed. The femto cells 32, 36, 40 provide local communications coverage for a user in the vicinity of those buildings. Each femto cell base station 30, 34, 38 communicates via a femtocell controller/gateway 230. A handover or camping event occurs between the base station 22 and the femto cell base stations 30, 34, 38 when the femto base stations 30, 34, 38 detect that user equipment comes within range. The femto cell base stations 30, 34, 38 typically utilise the user's broadband Internet connection 240 (such as ADSL Cable, etc) as a backhaul.

Femto cell base stations 30, 34, 38 are lower-power, low-cost, user-deployed base stations that provide a high cellular quality of service in residential or enterprise environment. In contrast to current macro cell approaches where complex and highly reliable base stations are deployed to strategic locations decided by the network owner, the femto cell base stations 30, 34, 38 are provided locally by customers. Such femto cell base stations 30, 34, 38 provide local coverage in areas of the macro network where quality of service may be low. Hence, the femto cell base stations 30, 34, 38 provide for improved quality of service in areas which are difficult for network operators. To reduce the cost of the femto base stations 30, 34, 38 and to reduce complexity and interference effects of the femto cell on other user equipment within the macro cell, the transmission power of the femto cell base station 30, 34, 38 is relatively low in order to restrict the size of the femto cell to a range of tens of meters or less. The femto cell base stations 30, 34, 38 have extensive auto-configuration and self-optimisation capability to enable a simply plug-and-play deployment. As such, they are designed to automatically integrate themselves into an existing macro cellular wireless network 20. In addition, some access point within the macro cellular network contains some functionality traditionally provided by the core network. One example is the UMTS base station router which integrates functions of the macro base station 20, RNC 170, SGSN 220 and GGSN 180.

As a result of the restricted range of the femto cell base stations 30, 34, 38, it is possible to obtain much more accurate and valuable location information than that possible using conventional macro cell location establishing techniques. For example, it is possible to establish whether user equipment is within a particular building or other location. This is particularly likely to be the case because such femto cells 32, 36, 40 are typically arranged to be coincidental with these structures since communications coverage within those structures is particularly difficult to achieve. The relatively small dimensions of the coverage area of the femto cell 32, 36, 40 provides the ability to accurately detect the proximity of user equipment and to tailor network applications based on this enhanced location information. This enables a new class of location and presence-based services to be provided by utilising available information relating to the movement of user equipment into and out of the coverage area provided by femto cells 32, 36, 40.

Accordingly, when a network application residing on an application server 100 requires location information such as, for example, whether a user equipment enters or is within a particular femto cell 32, 36, 40, its subscribes to receive this information from a location server 200. Although the location server 200 and application server 100 are shown as separate entities in the core network, it will be appreciated that they may be co-located in the femto cell controller/gateway 230 or provided somewhere in the Internet 190.

A particular user equipment may agree to subscribe services provided by a network application when that user equipment is located in particular femto cells. The network application determines during the subscription process an identifier which uniquely identifies the user equipment, such as its international mobile subscriber identifier (IMSI). The subscription process also identifies femto cell locations at which that service is to be provided. The network application also determines that the service is only to be provided if the user equipment has been registered at any of those femto base stations for, in this illustrative example, more than five minutes and that an assessment of whether the user equipment remains registered with the femto base station should also be made at five minute intervals. The network application then provides details of the user equipment and the femto cells to the location server 200.

The location server 200 then contacts those femto cell base stations supporting the service to the user equipment and requests they report events relating to that user equipment when they happen. For example, the location server 200 contacts those femto cells, transmits the IMSI of the user equipment, indicates that only occurrences of user equipment being registered for more than five minutes should be reported along with when communications with the user equipment is lost. The location server 200 provides information to femto cell base stations to cause those femto cell base station to report events as they occur and make presence, time and location information available. Furthermore, the location server 200 informs the femto cell base stations that once the user equipment has been registered for more that five minutes, paging messages should be sent to the user equipment at five minute intervals.

The femto cell base stations obtain notification of those events based on standard location update procedures which are forced to occur by arranging for adjacent cells within the macrocell to be allocated different location area codes to their neighbouring cells. Information on when a particular user equipment enters the femto cell can be determined by the resulting location update. Information identifying the user equipment is obtained by requesting its IMSI. Information on whether a user equipment is still located in the cell may be determined by repeatedly sending paging messages to the user equipment; if the user equipment responds to the paging message, then it is still located in the femto cell. The frequency of these paging messages is set by a location update accuracy set by the location server 200 in response to an accuracy requested by the application residing on the application server 100. Any relevant information is then transmitted by the femto cell base station via the location server 200 from where it is forwarded to the application server 100.

As mentioned above, femto cells 32, 36, 40 are allocated location area codes that are not used by the macro cells. Although the location area codes may be reused throughout the network 10 because a limited number of entries may be made in each neighbour list, adjacent femto cells are allocated different location area codes.

As user equipment roams throughout the network 10 the user equipment is handed over or camps between macro base stations. Typically, although each macro cell has its own ID, groupings of adjacent macro cells are provided with the same location area code in order to reduce the number of location updates required. However, when user equipment enters a femto cell, a location update occurs. Such a location update occurs when the user equipment is in the active mode because normal handover signalling occurs between the base station of the macro cell previously supporting the user equipment and the femto cell base station of the femto cell now supporting the user equipment. However, location updates are also forced when the user equipment is in the idle mode because each femto cell is configured with a different location area code, which is detected by the user equipment. Accordingly, the user equipment requests registration with the femto cell base station and sends it IMSI to the femto cell base station. This enables the femto cell base station to uniquely identify each requesting user equipment.

Figure 3:
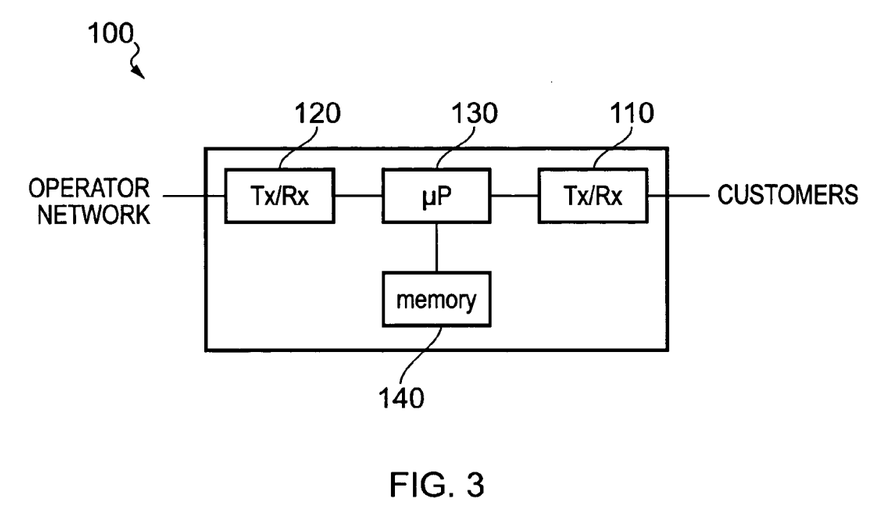
FIG. 3 illustrates components of an application server shown in FIG. 1.

FIG. 3 illustrates components of the application server 100 in more detail. The application server 100 comprises communication logic 110 operable to communicate with customers and communication logic 120 operable to communicate with the operator network. Coupled with the transmission logic 120, 110 is processing logic 130 which is provided with memory storage 140. The memory storage 140 stores information relating to services which network applications may provide to customers. The customers subscribe to these service by communicating with the network applications via the communication logic 110. Typically, the communication logic 110 will communicate with the Internet 190 either directly or via the femto cell controller/gateway 230. Although customers will generally communicate with the application server 100 via the Internet 190, it is possible that communication with the application server 100 may occur via the operator network when subscribing to services provided by network applications via text message or automated call-handling systems (not shown). Details of services provided are stored in the memory storage 140, together with details of user equipment subscribed to those services. The application server provides the service subscription details to the location server 200 either periodically or when user equipment subscribes or ceases subscription to a particular service.

Figure 4:
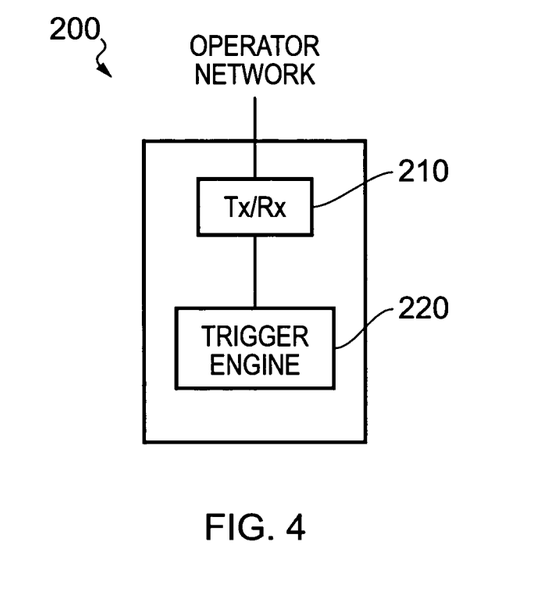
FIG. 4 illustrates components of a location server shown in FIG. 1.
Figure 5:
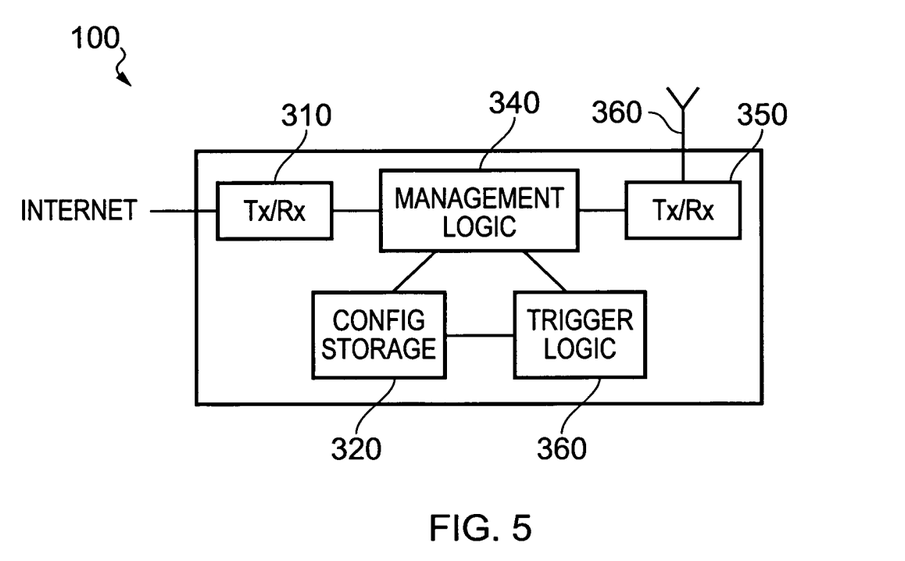
FIG. 5 illustrates components of a femto base station shown in FIG. 1.

FIG. 4 illustrates components of the location server 200 in more detail. The location server 200 includes communications logic 210 operable to communicate with the application server 100 and femto cell base stations via the operator network. The location server 200 also includes a trigger engine 220 which is responsive to information received from the application server 100 relating to trigger events and forwards relevant information to the femto base stations to cause them to report when such events occur. The trigger engine 220 also receives reports of events from the femto base stations and forwards relevant information on to the application server 100. FIG. 5 illustrates in more detail components of the femto base station. The femto base station communicates with the operator network via the Internet 190 and femto cell controller/gateway 230 using communications logic 310. Femto cell configuration storage 320 stores details of configuration information, such as the location area codes of the femto cells provided as part of the auto-configuration process of the femto cell base stations. The configuration storage 320 also stores details of registered user equipment for that femto base station, which is either provided locally or transmitted to the femto base station by the location server 200 for those user equipment which have subscribed to services provided by that femto base station. Management logic 340 controls the operation of the femto base station. Communication with user equipment is achieved via communications logic 350 which transmits using one or more antenna 360 to provide wireless communications within the femto cell. Trigger logic 360 is provided which stores information relating to the user equipment for that femto cell which, if registered with the femto cell base station should case a trigger notification to occur. The trigger logic 360 stores the IMSI of the user equipment for which a trigger notification should be generated, together with details of how long the user equipment may need to be registered with the femto base station prior to a notification being issued via the communications logic 310 over the Internet 190 to the location server 200. Also, details of how often a paging message should be sent to the user equipment once it has caused a trigger notification to occur is stored. The trigger logic 360 maintains a list of those user equipment which are attempting to register, those user equipment which has registered and the time at which they successfully registered, together with an indication of the time at which the user equipment last responded to a paging message. This information may then be provided to the location server 200.

Figure 6:
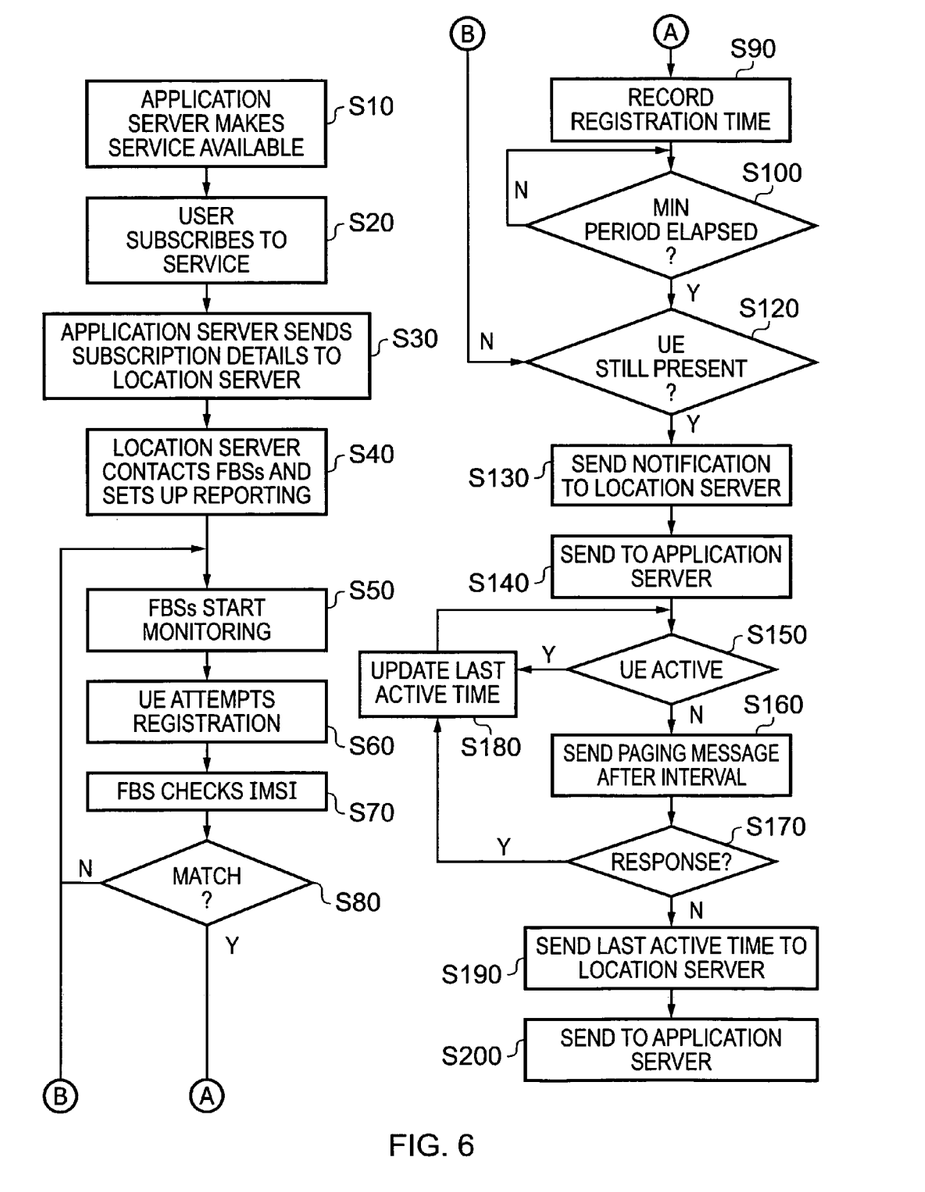
FIG. 6 illustrates the main processing steps of the application server, location server and femto base station shown in FIG. 1.

FIG. 6 illustrates the main processing steps performed by components of the wireless telecommunications network shown in FIG. 1.

At step S10, the application server 100 provides a network application which makes one or more services available.

At step S20, a user subscribes to one of these services. The user provides their IMSI or other identifier which is used to identify the user equipment.

At step S30, the application server 100 sends details of the user equipment and the subscribed service to the location server 200, together with any timing accuracy detail, such as a minimum time which the user equipment needs to remain registered with the femto cell base station and/or a minimum period which may elapse before which the femto cell base station needs to check that the user equipment is still in range.

At step S40, the location server 200 determines from that information, the femto base stations which need to be contacted, together with details of the user equipment and any timing accuracy information which needs to be provided. This information is provided by the location server 200 to the femto base stations.

Thereafter, at step S50, the femto base stations start monitoring for these events.

At step S60, a user equipment attempts registration with a femto base station.

At step S70, the femto base station checks the IMSI of the registering user equipment against those stored in its trigger logic 360.

At step S80, if there is no match, then the user equipment is not subscribed to any service provided by that femto base station and processing returns to 550. If there is a match, then processing proceeds to step S90 where the trigger logic 360 records the registration time for that user equipment.

At step S100, the trigger logic 360 determines whether it has been informed by the location server 200 that there is a minimum predetermined period of registration which must elapse prior to a notification being sent. If there is a minimum predetermined period, then the femto base station waits that predetermined period and when the period has elapsed processing proceeds to step S120. If there is no minimum predetermined period, then the femto base station does not wait and processing proceeds straight to step S120

At step S120, the femto base station determines whether the user equipment is still present if a minimum predetermined period of registration was required. This may be achieved either by checking whether the user equipment is currently active, or by sending a paging message to the user equipment and awaiting a response. In the event that the user equipment is not present after the minimum period, processing returns to step S50 and no notification is sent. However, if the user equipment is still present, then processing proceeds to step S130.

At step S130, the femto base station sends s notification to the location server 200 via the Internet backhaul 240. The location server 200 receives that notification and forwards this onto the application server 100 to indicate that a user equipment has utilised a service.

Meanwhile, at step S150, a determination is made as to whether the user equipment is active. If the user equipment is active, the last active time stored by the trigger logic 360 for the user equipment is updated. If the user equipment is not active, such as would occur in the idle mode, then the femto base station sends a paging message after a predetermined interval set by the timing information received by the trigger logic 360 from the location server 200.

At step S170, the femto base station determines whether the user equipment has responded to the paging message and, if so, updates the last active time stored in the trigger logic 360 to indicate the time at which the user equipment responded to that paging message. Thereafter, processing returns to step S150. If no response is received, the processing proceeds to step S190.

At step S190, the femto base stations sends a notification to the location server 200 which indicates the last time at which the user equipment was deemed by the femto base station to be present.

At step S200, this notification is then forwarded on to the application server 100.

Accordingly, it can be seen that this approach provides an efficient technique for making available location and presence information of user equipment. This enables location and presence based services to be provided in an efficient manner to user equipment. Continuous monitoring of the user locations is not required, but events of interest are readily detectable. This provides reduces the signalling and processing effort which limits the scalability of previous technique. Since the coverage area of femto cells is relatively small, a high degree of location accuracy can be determined both indoors and outdoors. No changes are required to the functionality of the core network, all that is required is the addition of the application server 100 and location server 200 which are readily integrated into the core network, together with some changes in the functionality of the femto base stations. However, no changes are required to the user equipment to enable them to take advantage of the services.

Although in the examples described above, the IMSI of subscribers to particular services are provided to every femto cell base station that supports that service, in some situations this may be impractical. This may be particularly the case for certain services where there would be insufficient storage capacity in the femto cell base stations to store the details of many millions of subscribers. Also, it may be desirable for security reasons not to store this information in femto cell base stations. In these circumstances, the location server 200 may provide information to the femto base stations providing the services requiring those femto base stations to provide a notification to the location server 200 of any user equipment registrations which occur. The notification will include the IMSI of the user equipment, an identifier for the femto base station, together with details of when the registration occurred in a similar manner to that described above. The location server 200 or application server 100 would then determine from the IMSI whether the user equipment was subscribed to a service provided by that femto base station.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A method of providing location information to a network application, said location information indicating a location of user equipment within a wireless telecommunications network, said method comprising:
receiving details of a triggering event which is to be notified to said network application, said triggering event being a registration of a predetermined user equipment with a predetermined femto cell of said wireless telecommunications network;
providing triggering information indicative of said triggering event to that femto base station providing wireless communications coverage to said predetermined femto cell to cause that femto base station to provide a trigger notification indicating when said triggering event occurs;
in response to receipt of said trigger notification from said femto base station, providing location information to said network application, said location information providing said network application with an indication of said predetermined user equipment and said predetermined femto cell, together with an indication of when said triggering event occurred.

2. The method of claim 1, wherein said triggering event comprises registration of said predetermined user equipment with said predetermined femto cell for a predetermined period of time and said triggering information indicates to said femto base station that registration of said predetermined user equipment for said predetermined period of time should occur before said trigger notification is provided.

3. The method of claim 2, comprising:
receiving details of a location update rate following a triggering event;
providing update information to said femto base station in response to said update rate, said update information being indicative of a rate at which said femto base station should determine whether said predetermined user equipment can still support wireless communications with said predetermined femto cell.

4. The method of claim 3, wherein said update information comprises an indication of a rate at which said femto base station is to repeatedly send a paging message to said predetermined user equipment.

5. The method of claim 3, comprising:
upon receipt of an indication from said femto base station that said predetermined user equipment can no longer support wireless communications with said predetermined femto cell, said indication comprising information indicating when said predetermined user equipment was last determined to have wireless communications with said predetermined femto cell, providing location information to said network application identifying when said user equipment was last determined to support wireless communications with said predetermined femto cell.

6. The method of claim 1, wherein receiving comprises:
receiving details of a plurality of triggering events, each of which is to be notified to said network application, each triggering event being a registration of a predetermined one of a plurality of said user equipment with a predetermined one of a plurality of said predetermined femto cells of said wireless telecommunications network, and wherein providing comprises:
providing triggering information indicative of each of said plurality of triggering events to those femto base stations providing wireless communications coverage to said plurality of said predetermined femto cells to cause those femto base stations to provide a trigger notification indicating when one of said triggering events occurs; and
in response to receipt of said trigger notification from one of said femto base stations, providing location information to said network application, said location information providing said network application with a unique identifier indicative of said user equipment and a unique identifier indicative of said predetermined femto cell, together with an indication of when said triggering event occurred.

7. A location server operable to provide location information to a network application, said location information indicating a location of user equipment within a wireless telecommunications network, said location server comprising:
triggering event reception logic operable to receive details of a triggering event which is to be notified to said network application, said triggering event being a registration of user a predetermined equipment with a predetermined femto cell of said wireless telecommunications network;
trigger information transmission logic operable to provide triggering information indicative of said triggering event to that femto base station providing wireless communications coverage to said predetermined femto cell to cause that femto base station to provide a trigger notification indicating when said triggering event occurs; and
trigger notification reception logic operable, in response to receipt of said trigger notification from said femto base station, to provide location information to said network application, said location information providing said network application with an indication of said predetermined user equipment and said predetermined femto cell, together with an indication of when said triggering event occurred.

* * * * *